United States Patent [19]
Harris

[11] Patent Number: 5,849,239
[45] Date of Patent: Dec. 15, 1998

[54] PROCESS OF PROGRAMMING END-PRODUCT PROPERTIES OF SAME PHASE ELECTROSET COMPOSITIONS

[76] Inventor: Mary Elizabeth Harris, 4446 Bucks Schoolhouse Rd., Baltimore, Md. 21237

[21] Appl. No.: 895,840

[22] Filed: Jul. 17, 1997

[51] Int. Cl.[6] ............................. H01B 1/20; B29C 39/00; B29C 35/02
[52] U.S. Cl. ......................... 264/408; 264/413; 264/449; 264/450; 264/451
[58] Field of Search ................................. 264/402, 408, 264/449, 450, 451, 494, 496, 413

[56] References Cited

U.S. PATENT DOCUMENTS

| | | | |
|---|---|---|---|
| 5,194,181 | 3/1993 | Reitz | 252/500 |
| 5,232,639 | 8/1993 | Reitz et al. | 264/22 |
| 5,518,664 | 5/1996 | Reitz | 252/518 |

Primary Examiner—Christopher A. Fiorilla

[57] ABSTRACT

A new class of programmable electroset compositions in an uncured state consist of both a dielectric phase changing vehicle that is a fluid and an electrically conductive additive which is also a fluid. Compositions of the present invention are programmably responsive to electric energy input during cure such that the final, cured end-product properties are altered by at least 5% from those that would be obtained without such electric energy input. The programmably alterable properties include density, hardness and bouyancy. A new method wherein the extent of curing of the compositions is monitored requires the monitoring of both the input voltage and input current during electrosetting of the composition.

9 Claims, 1 Drawing Sheet

PROCESS OF PROGRAMMING END-PRODUCT PROPERTIES OF SAME PHASE ELECTROSET COMPOSITIONS

BACKGROUND OF THE INVENTION

1. Field of the Invention

This invention relates to the field of electrosettable compositions (herein also referred to as electrosetting compositions) and processes associated with the cure of electrosettable compositions.

2. Some Background Information

Electrorheological Fluids (hereafter referred to as ERFs) are fluids that solidify in the presence of an electric field. Many different formulations of ERFs consist of electrically polarizable particles that are immersed within and suspended throughout a dielectric oil. Prior art Electrosettable Compounds (hereafter referred to as ESCs) are electrically polarizable particles immersed within dielectric casting resins. ESCs are distinguished from ERFs in that ESCs are cured into molded, permanent, solid articles. On the other hand, ERFs are only solid when in an electric field. They return to their fluid state when the electric field is removed. Hence, for the purposes of this disclosure, such ERFs consisting of aggregate particles in a dielectric oil are not considered "permanent" solids. The term "permanent solids", as used herein, shall refer to only those materials that are solid when they are not subjected to an electric field. No energy needs to be applied to a permanent solid in order for that permanent solid to remain solid. ERFs consisting of aggregate particles in a dielectric oil are therefore "temporary solids". The reason why they are only "temporary" solids is that, when the electricity is removed, these ERFs return to their fluid state. Such ERFs have reversible solidity. On the other hand, ESCs, once hardened into a permanent solid, will not return to a fluid state or fluid phase when they are subsequently placed in a non-electrified condition.

Prior art ESCs and electrosetting processes are taught in U.S. Pat. Nos. 5,518,664; 5,194,181 and 5,232,639. In keeping with U.S. Patent Office practice, these patents shall be hereafter referred to as '664, '181 and '639, respectively. The cited prior art patents teach that ESCs are compositions that are susceptible to the second Reitz effect. Numerous examples of such prior art ESCs are provided in '181, '639 and '664. Each of the prior art ESCs comprise a dielectric phase changing vehicle and an electrically polarizable aggregate. The term "phase changing vehicle" as used herein refers to polymer casting resins that are initially fluid and that can be molded and cured into permanent solid articles. The term "aggregate" as used in '181 and as used herein, refers to a multiplicity of electrically polarizable particles. Examples of suitable aggregate particles as taught in the cited prior art include crystalline cellulose particles, corn starch particles, aluminum powder, and powdered carbon in the form of graphite. Examples of suitable prior art phase changing vehicles include RTV silicone rubber; Varathane liquid plastic; Fabulon Ultra Gloss Epoxy Bar Top Finish; a two-part polyurethane casting composition known as RP6402 manufactured by Ciba Geigy Corporation of East Lansing Mich.; a two-part composition consisting of polyester resin and a curing agent comprising methyl ethyl ketone peroxide; and a two-part (i.e. casting compound consisting of a resin and a hardener) epoxy sold under the name of Two Ton Epoxy manufactured by the Devcon Corporation.

All such prior art ESCs are castable fluid compounds comprising a dielectric phase changing vehicle into which the solid particles of aggregate have been mixed. All ESCs share a significant characteristic which is that their rate of cure can be electrically accelerated. This phenomenon is known as the second Reitz effect. In '639 and '664, it is taught that some ESCs have electrically "programmable" end-product properties. In other words, some of these ESCs have final (i.e. cured) material properties that can be significantly altered and controlled by controlling the amount of voltage and current applied to these ESCs during cure. The final or cured properties are referred to in the cited prior art as "end-product properties" as taught in '664. Such properties include density, compressibility, hardness and adhesion. All ESCs with such "programmable" properties shall hereafter be referred to as Programmable Electroset Compositions or PESCs. Like the nonprogrammable ESCs, the PESCs comprise a dielectric phase changing vehicle into which have been mixed the solid aggregate particles. Each of the cited prior art Programmable Electroset Compositions or PESCs comprise a fluid (i.e. the dielectric phase changing vehicle) and aggregate solids (i.e. the particles). Because they are solids mixed in which a fluid, these prior art PESCs will be referred to herein as "heterogeneous Programmable Electrosettable Compositions" or "heterogeneous PESCs". The term "heterogeneous PESC" as used herein refers to any PESC that, prior to curing, comprises both a fluid constituent (i.e. the dielectric phase changing vehicle) and solid constituents (i.e. the solid aggregate particles) that are electrically polarizable.

DISADVANTAGES OF THE CITED PRIOR ART

The cited prior art, while useful, suffers from a number of disadvantages. One disadvantage is that the initial viscosity of these PESCs increases as the percentage of aggregate particles is increased. PESCs with high percentages of aggregate particles therefore have high initial viscosities. Because of their high initial viscosity, they do not pour as well as low viscosity fluids.

Pouring takes more time for high initial viscosity fluids than it does for low initial viscosity fluids. Many Americans are familiar with this phenomenon of waiting for the high initial viscosity fluid to pour. One American catsup manufacturer (Heinz) even based some of its television commercials on this, using Carol King's song "Anticipation" as its theme. It is disadvantageous for a manufacturer to be waiting appreciable lengths of time for high viscosity fluids to pour into their molds. Therefore, the prior art PESCs of high initial viscosity have a significant disadvantage in their initial high viscosity.

Another disadvantage of the cited prior art PESCs is that mixing the components of such PESCs that have high percentages of aggregates is much more difficult than those PESCs with low viscosity.

Still another disadvantage of the cited prior art PESCs is that they lack uniformity throughout. In the mixing of the heterogeneous PESC components, the solid aggregate particles can cluster in groups of various, nonuniform size and dimension. The articles molded from such PESCs therefore lack uniform material properties throughout.

Yet another disadvantage of the cited prior art heterogeneous PESCs is that the formulations are limited to those that have solid aggregate particles within. The formulations are limited to just solids that are electrically polarizable. Thus, with the prior art heterogeneous PESCs, there are only a limited number of materials from which the constituents can be chosen.

In each example provided in '181, '639 and '664, the ESC and PESC was positioned within its respective mold and electrified until cured. Only after curing, were each of the final articles handled.

SUMMARY OF THE INVENTION

A new class of programmable electrosettable compositions (PESCs) are disclosed herein. The PESCs of the present invention comprise fluid constituents initially (i.e. prior to being cured). In other words, the constituents of the PESCs of the present invention are fluid prior to any curing. Because the PESCs of the present invention are (prior to curing) totally fluid, they shall be referred to herein as "same phase PESCs" or "same phase Programmable Electrosettable Compositions". Thus the term "same phase PESC" refers to any PESC wherein all of the constituents are fluid prior to any curing of the PESC. The term "same phase" is refers to the fact that the constituents of the PESC of the present invention are all initially fluid.

Because the constituents are fluid, the PESCs of the present invention have no solid particles to cluster or clump within them. This is NOT to say that are not any inhomogeneities (i.e. variations of constituents) from region to region within the PESCs of the present invention. In many cases, the constituents may vary from region to region within the PESC. However, all of those constituents are fluid, in their initial condition prior to curing. The "same phase PESCs" of the present invention have programmable end-product properties. This means that their end-product properties can be controllably electrically altered in a manner similar to those of the prior art heterogeneous PESCs.

A "same phase PESC" of the present invention comprises a dielectric phase changing vehicle and a suitable, electrically conductive or electrically semiconductive, fluid additive mixed therein. The suitable additive must have the following characteristics:

1. It must be fluid; and,
2. It must be electrically conductive or electrically semiconductive.

Additionally, it is <u>desirable</u> that the fluid additive be miscible, or at least partially soluble, in the dielectric phase changing vehicle. While the miscibility of the additive is desirable (for making the PESC more homogeneous), it is not necessary. Some formulations of the present invention utilize fluid additives that are immiscible in the dielectric phase changing vehicle. But the miscibility of the fluid additive in the phase changing vehicle is desirable because the same phase PESCs made from those constituents are more homogeneous from region to region than those PESCs made from immiscible constituents.

It has also been found that, in general, the weight of the electrically conductive or semiconductive fluid additive should not exceed 20% the overall weight of the PESC. In many cases, it should not exceed over 10% the overall weight of the PESC. In general, PESC formulations with such high percentages of fluid additive do not cure into solid articles which have significant tensile strength, compression strength or other material properties that are useful for molded articles.

The "same phase PESCs" of the present invention, like the heterogeneous PESCs of the cited prior art, have curing rates which are electrically accelerated by applying electricity to them and running an electrical current through them during cure.

There are still other requirements for a composition to be a PESC of the present invention. These can best be understood when the process of programming the end-product properties is considered. Programming requires that electrical energy be input into the PESC. This electrical energy does useful work upon the PESC. By definition, the amount of electrical energy input into the PESC (in watts) is equal to the amount of voltage drop across the PESC (in volts) times the electrical current that passes through the PESC (in amps). In other words, volts X amps=watts (eq. 1)

Equation 1 (eq. 1) is a useful equation for understanding the processes involved. Sufficient energy must be input into the same phase PESC in order that the end-product properties be "programmed". The input electrical energy performs useful work. The work performed results in the alteration of the end-product properties of the cured PESC from those end-product properties that would be obtained if no electrical energy is input into the PESC during cure.

The initial electrical conductivity of a same phase PESC is therefore important. If the initial (i.e. prior to any curing) conductivity of the same phase PESC is too high, then little voltage drop occurs across the PESC during cure. The first term of eq. 1 (i.e. voltage) is so small that the third term (i.e. watts) of the equation is negligible.

On the other hand, if the initial conductivity of the same phase PESC is too low, then the second term of eq. 1 (i.e. amps) is so small that the third term (i.e. watts) is negligible. Thus, if the initial conductivity of the same phase PESC is too low or, alternatively, is too high, then the amount of electrical energy that can be input into the PESC is so small that the process of programming in the end-product properties cannot be carried out.

It is readily understood, therefore, that the initial conductivity of the same phase PESC is important, indeed critical, for enabling the process of electrically altering the end-product property. It is important that the conductivity of a same phase PESC be neither too low, nor too high. The initial conductivity (i.e. the conductivity just after the constituents have been mixed and before any curing has taken place ) of a "same phase PESC" should fall within the range of about $$1 \times 10^{-11} (mho/cm) < \sigma < 1 \times 10^{-2} (mho/cm)$$

where $\sigma$ is the conductivity of the "same phase PESC".

Additionally, the same phase PESC must be programmably responsive to electrification in the manner similar to those prior art PESCs disclosed in '664. The present invention provides an advantageous means of altering the properties of floatation devices, lightweight containers and other polymeric articles. Prior art processes for programming (i.e. altering) of the end-product properties of a PESC was limited to:

providing a heterogeneous PESC;

positioning the heterogeneous PESC between at least two electrically conductive substrates, charging the substrates so as to expose the heterogeneous PESC to an electric field; and maintaining said charging so as to establish a current within the heterogeneous PESC whereby the cured PESC composition has at least one end-product property altered by at least 5% from that which would be obtained had no electrification of the heterogeneous PESC occurred. The processes of the present invention differ from those of prior art in that a "same phase PESC" is provided and then positioned within at least two electrically conductive substrates which are then charged, thereby establishing an electric field across the "same phase PESC"; maintaining the charge so as to establish a current through the "same phase PESC"; whereby the said "same phase PESC", in a cured state, has at least one end-product property which is altered by at least 5% with respect to that said end-product property which would be obtained for "same phase PESC", in a cured state, by a process of curing said "same phase PESC" which does not include said charging; and whereby the alteration is a function of the amount of said current within said "same phase PESC".

Heretofore (i.e. up until the time of the reduction to practice of the present invention), the only electrosettable compositions with programmable end-product properties were those which were of the heterogeneous type of PESC. Heretofore, (i.e. up until the time of the reduction to practice of the present invention), the only electrical processes of programming into a PESC the desired end-product properties were known to be effective on heterogeneous PESCs. Processes of the present invention are effective on "same phase PESCs" for programming into the same phase PESC the end-product properties of cured articles made from said same phase PESCs. Processes of the present invention enable the end-product properties of the same phase PESCs to be altered by electrifying the PESC during cure. These end-product properties include density, hardness, buoyancy and other material properties.

The processes of the present invention also provide a method whereby the extent of gelation (i.e. how much the PESC has gelled) and cure can be monitored during the programming of the end-product properties of the same phase PESCs. This method of monitoring requires that, during cure, the current passing through the same phase PESC and voltage dropping across the same phase PESC be determined, thereby enabling the conductivity of the PESC to be known. The extent of gelation can be determined using this information.

It has been discovered that same phase PESCs undergo dramatic changes in their conductivity during cure. These changes in conductivity during cure can be used to monitor the extent of gelation of the PESC as it solidifies. For example, just before the beginning of the process of electrically curing the same phase PESC, the PESC has some initial conductivity. As the PESC begins to be electrified, its conductivity increases. This conductivity increase continues for some time duration, whereupon the conductivity reaches a peak value. Thereafter, the conductivity of the PESC begins to diminish. Generally, it is at this point in the curing process that the PESC begins to gel. Thereafter, the conductivity continues to diminish over time as the PESC continues to harden into a permanent solid. This trend (i.e. the first increase in the conductivity and thereafter the subsequent decrease) in conductivity during programming is generally true for same phase PESCs, regardless of the specific phase changing vehicle or conductive fluid additive of which the PESC is comprised.

The method of monitoring the conductivity of the same phase PESC during cure is useful and advantageous. One advantage of the method of monitoring is that it assures the manufacturer that the process of electrically programming the PESC is proceeding in a manner that is expected. If, during the process of programming the same phase PESC, the conductivity deviates significantly from the expected rise and fall (i.e. the expected increase and subsequent decrease), the monitoring process can alert the manufacturer that an accident has occurred. For instance, if the conductivity does not change appreciably over the time period of attempting to program the end-product properties of the same phase PESC, in general there is something wrong with the processing arrangement. It may be that there is a short circuit in the electrical circuitry which is preventing the same phase PESC from being electrified. Or, alternatively, it may be that a ground fault has occurred in the electrical equipment used. In both of these instances, the PESC would not be electrically energized. Therefore, its conductivity does not significantly change (i.e. first rise, then fall) appreciably over the time period in which the PESC is intended to be electrically programmed. It is therefore advantageous to monitor the conductivity of the same phase PESC during cure so as to render assurance that the process of programming the PESC is proceeding as expected and that no accidents such as shorts and ground faults have occurred in the electrical circuitry used to electrically program the PESC.

There are many advantageous uses of the present invention. For example, many desirable goods can be fabricated using the present invention. Foamed floatation devices, lightweight containers and lightweight structures are but a few of the many useful goods that can be fabricated using the present invention.

Advantages of the present invention.

One advantage of the same phase PESCs of the present invention is that, in general, the same phase PESCs typically have lower initial viscosities than the heterogeneous PESCs of the cited prior art. This is because all of the constituents are fluid. The fluid additives, in particular, have lower viscosities than the solid aggregate particles of the cited prior art. This means that the same phase PESCs of the present invention typically are easier to pour than the higher viscosity heterogeneous PESCs of the cited prior art.

Another advantage of the same phase PESCs is that the constituents are easy to stir and mix together.

Still another advantage of the same phase PESCs of the present invention is they provide an alternative selection of constituents that can effectively be used in a PESC. Formulations of the same phase PESCs are not limited to utilizing solid, electrically polarizable aggregate particles as are the cited prior art PESCs. The present invention enables new formulations of PESCs to be used without the need of utilizing solid, electrically polarizable particles in a PESC.

In many cases, the fluid additives of the present invention are less expensive than the solid particles of the cited prior art. The PESC formulations of the present invention can therefore in many cases be used to reduce the cost of producing goods and articles made from PESCs.

Furthermore, in circumstances wherein the known solid aggregate particles are not available, the fluid additives of the present invention might be readily available. The present invention can therefore make the constituents needed for formulating PESCs more readily available to manufacturers utilizing PESC formulations in the making of their articles and goods.

It is yet still another advantage of the present invention to provide a process wherein the end-product properties of same phase PESCs can be electrically programmed.

It is yet still a further advantage of the present invention to provide a method of determining, during cure, the extent of gelation of "same phase PESC".

It is yet still another further advantage of the present invention to provide a monitoring method capable of assuring the manufacturer that the process of programming in the end-product properties of a same phase PESC is proceeding normally.

The present invention also provides an advantageous means of altering the properties of a floatation device made from same phase PESCs not found in prior art. Prior art manufacturing of floatation devices required that the formulation of castable polymer be changed in order to significantly alter the buoyancy of the floatation device. Such a change of formulation requires that time consuming and messy job of recalculating the proportions of polymer constituents to be, measuring out these new proportions of polymer constituent materials and then mixing. Alternatively, the prior art heterogeneous PESCs can be used for this purpose, but these have the aforementioned disadvantages.

The same phase PESCs of the present invention, on the other hand, do not need to be reformulated in order to yield changes in buoyancy of the floatation devices. Nor do they suffer from the aforementioned disadvantages of prior art heterogeneous PESCs.

Objects of the Invention

It is an object of the invention to provide PESCs generally having low initial viscosities.

It is another object of the invention to provide PESCs wherein the constituents comprise fluids.

It is still another object of the invention to provide PESCs that are easy to stir and mix together.

It is yet another object of the present invention to provide an alternative selection of constituents that can effectively be used in a PESC formulations.

It is still yet another object of the present invention to provide PESC formulations wherein the constituents are readily commercially available.

These and other objects of the invention will be further clarified in the detailed description of preferred embodiments when considered with accompanying drawings wherein:

DETAILED DESCRIPTION OF PREFERRED EMBODIMENTS

A "same phase PESC" of the present invention comprises a dielectric phase changing vehicle and a suitable electrically conductive or semiconductive fluid additive mixed therein. In general, any phase changing vehicle that is substantially a dielectric material is suitable for use in the PESCs of the present invention. Such dielectric materials include (but are not limited to) polyester, epoxy, latex, polyurethane or other dielectric phase changing vehicle useful in the making of molded articles. Electrically conductive or electrically semiconductive fluids useful as the fluid additive of the present invention include (but are not limited to) ammonia; fluid acids such as nitric, acetic, oleic and sulfuric acid; esters of acids, and other conductive or semiconductive fluids.

Several "same phase PESC" materials were fabricated and tested to determine their end-product physical properties. During the process of electrically curing the same phase PESC materials, a Glassman 30 kilovolt (kv), 50 milliamp (ma) high voltage power supply, Model PSLX030P was used to electrically energize the PESC materials. This power supply has the convenient features of both a tunable voltage limiter dial (which limits the maximum allowable output current) and a tunable voltage limiter dial (which limits the maximum allowable output voltage). Each dial also has an adjacent corresponding milliamp meter and kilovolt meter, respectively. Hereafter, unless otherwise specified, this supply was used in all tests of sample materials in accordance with the various examples.

Figure 1:
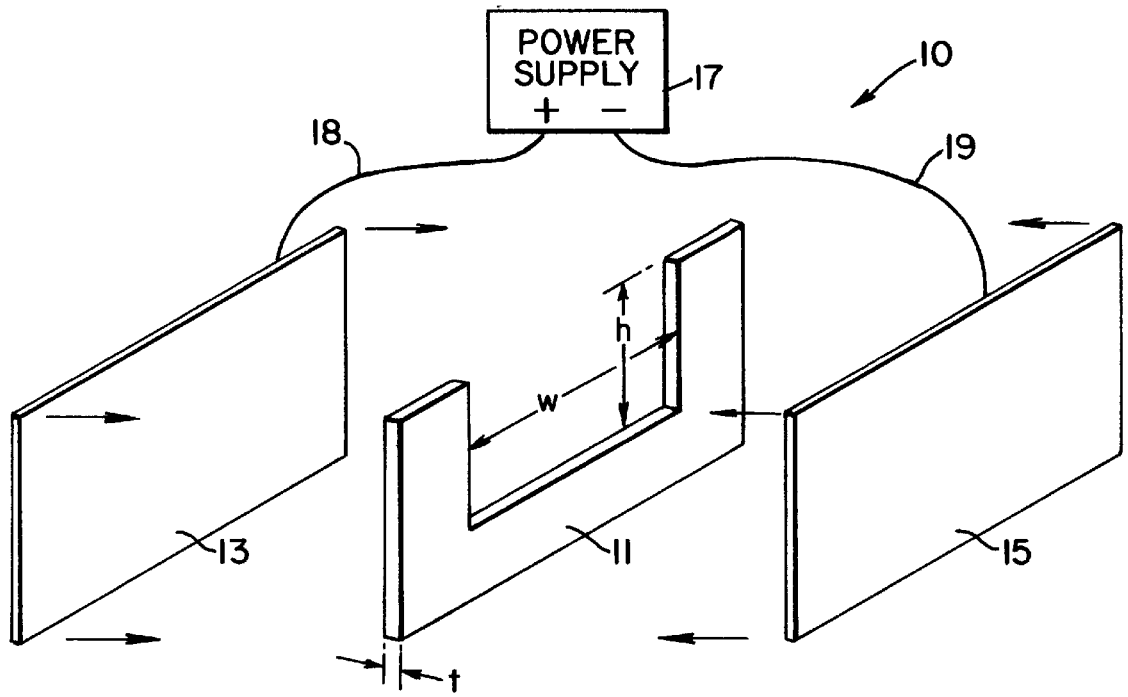
FIG. 1 is a perspective exploded view of a simple electroset mold.

In association with the data presented for all of the samples of the examples herein disclosed, several molds for electrical programming of the same phase PESCs were used. These were constructed generally conforming to mold 10 as shown in FIG. 1. Electroset mold 10 comprises spacer 11 and electrode plates 13 and 15. Spacer 11 is made of an electrically insulating material, such as for example wood. Plates 13 and 15 are made of conductive material, such as for example aluminum or steel. High voltage power supply 17 is shown adapted to electrically energize electrode plates 13 and 15 through power wires 18 and 19, respectively. During molding, electrode plates 13 and 15 are moved into an abutting relationship with the principal faces of spare 11 and securely retained so that the molding material does not readily escape form the molding area. In acquiring the test data set out in Tables 1-9, the electrode plates were additionally sealed to the spacer using plastic postal mailing tape manufactured by the 3M Company. Additionally, for the test data shown in Tables 1-9, spacer 11 had inside dimensions: t about 1.0 inches (2.54 cm); w about 4.5 inches (11.43 cm) and h about 4.5 inches (11.43 cm) where t, w and h are as shown in FIG. 1. Electrode plates 13 and 15 were made of aluminum and had the dimensions of about 5.5 inches (13.97 cm) by about 5.5 inches (13.97 cm) by about 0.125 inches (0.3175 cm) thick. During the process of electrically curing the samples, mold 10 is held in a generally upright position with the open area opposite gravitational forces for convenience in pouring the uncured same phase PESC into the mold.

In Tables wherein there is hardness data, the measurements of material hardness were performed with a Rex Durometer instrument, type 'D' model standard dial which is produced by the Rex Gauge Co. in Glenview Ill. This gauge bears U.S. Pat. No. 2,421,449 and was used in compliance with standard hardness measurement practices. The hardness number shown in the tables is the average of 10 measurements per sample.

EXAMPLE 1

A same phase PESC was fabricated by mixing 5 grams of clear ammonia into 55 grams of an epoxy resin and thereafter adding 55 grams of epoxy hardener to the resultant mixture. The same phase PESC constituents were mixed thoroughly. The epoxy resin and epoxy hardener were the constituents of a two part epoxy that is marketed under the product name Ultraglo and manufactured by ETI of Fields Landing, Calif. It was purchased from Read Plastics in Rockville, Md. The clear ammonia was sold under the Super G brand name, distributed by Super G, Inc., of Landover, Md. and purchased at a local Giant Food store.

After thoroughly mixing the constituents of the same phase PESC of Example 1, the PESC was poured into an electroset mold.

Sample 1 of Example 1 was the first sample fabricated . The formulation was poured into an electroset mold like the one illustrated in FIG. 1. The power supply output was set at a maximum output voltage of 8 kilovolts (kv) and a maximum output current of 10 milliamps (ma) and the mold energized. Within six minutes the sample had foamed and solidified into a permanent solid.

A second sample (sample 2) was fabricated in the same manner as the first sample (i.e. sample 1 of example 1) but with the power supply settings tuned with the maximum output voltage set at 8 kilovolts and maximum output current set at 5 milliamps.

A third sample (sample 3) was fabricated in the same manner as the first sample (i.e. sample 1 of example 1) but with the power supply settings tuned with the maximum output voltage set at 4 kilovolts and maximum output current set at 2 milliamps.

A fourth sample (sample 4) was fabricated in the same manner as the first sample (i.e. sample 1 of example 1) but with the power supply turned off so that no electric energy was applied to the sample.

A fifth sample (sample 5) was fabricated in the same manner as the first sample (i.e. sample 1 of example 1) but with the power supply settings tuned with the maximum output voltage set at 8 kilovolts and maximum output current set at 0 milliamps.

After the samples of example 1 were fabricated, they were removed from their molds and their densities measured. The results obtained are given in Table 1-1.

TABLE 1-1

PHYSICAL PROPERTIES vs. MAXIMUM POWER SUPPLY OUTPUT SETTINGS

| Sample number | maximum allowed ouput voltage (in kilovolts) | maximum allowed output current (in milliamps) | sample density (in grams per cubic inch) | |
|---|---|---|---|---|
| 1 | 8 | 10 | 4.94 | (g/cc) |
| 2 | 8 | 5 | 7.04 | (g/cc) |
| 3 | 4 | 2 | 9.76 | (g/cc) |
| 4 | 0 | 0 | 10.27 | (g/cc) |
| 5 | 8 | 0 | 10.27 | (g/cc) |

The data for samples 1–4 of example 1 clearly demonstrate the variance in the end-product property of density. These density variations are clearly a function of the maximum allowed electric energy input into the samples. Samples 1, 2 and 5 clearly demonstrate density variations as a function of the maximum amount of current permitted to flow through the PESC samples during cure.

These tests were repeated several times and equivalent results were obtained each time, clearly demonstrating that same phase PESCs can be electrically programmed to have a desired density within a range of values.

The applied voltage and current to the sample in sample 2 was monitored continuously and the input voltages and currents recorded in one minute intervals. The observed input voltages and current as a function of time after the sample began to be electrically energized are shown in Table 1-2.

TABLE 1-2

Observed input voltages and currents supplied to sample 2 by the power supply as a function of time (in minutes) after the sample started to be electrified.

| time after sample 2 began to be electrified (in min.) | observed input voltage (in kilovolts) | observed input current (in milliamps) | remarks |
|---|---|---|---|
| 0 | 8 | 5 | |
| 1 | 5 | 5 | |
| 2 | 3 | 5 | |

TABLE 1-2-continued

Observed input voltages and currents supplied to sample 2 by the power supply as a function of time (in minutes) after the sample started to be electrified.

| time after sample 2 began to be electrified (in min.) | observed input voltage (in kilovolts) | observed input current (in milliamps) | remarks |
|---|---|---|---|
| 3 | 2 | 5 | |
| 4 | 2 | 5 | |
| 5 | 2.1 | 5 | |
| 6 | 2.5 | 5 | sample began foaming |
| 7 | 3 | 5 | sample began expanding and started gelling |
| 8 | 5 | 5 | sample still expanding |
| 9 | 7 | 5 | expansion slowed, it is very viscous (plastic) |
| 10 | 8 | 4.5 | expansion stopped, sample is soft solid |
| 11 | 8 | 3 | sample is hardening |
| 12 | 8 | 2.5 | sample is still hardening |
| 13 | 8 | 2.0 | sample is relatively hard |
| 14 | 8 | 1.9 | sample remains hard |

After 14 minutes of the sample 2 being electrically energized, the power was turned off. The sample and mold were hot to the touch so they were permitted to stand for about 20 minutes and cool down.

Although the reasons for the foaming and programmable density are not known, it is known that the epoxy resin and hardener, when mixed together in adequate quantities, hardens by means of exothermic chemistry. When no voltage is applied to this material, solidification takes place between 30 minutes and 1 hour after mixing. The reduction in solidification time for electrified samples such as sample 2 is notable. This reduction in time is proportional to the maximum electrical input settings on the power supply.

A duplicate set of samples of samples 1–4 in example 1 were later fabricated. These were cut open and examined. A number of voids were found within the less dense sample. Samples 4 and 5, while also having been found to have voids therein, were observed to have far less than samples 1 and 2. The amount of observable voids within the samples varied as a function of their density. It is not known by what physical and/or chemical reactions cause the PESC to have a programmable density. The fact is, however, that the end-product property of density of the same phase PESC formulation in Example 1 was observed. It was, however, observed that the amount of foaming PESC and amount of subsequent voids found within the permanently hardened (i.e. cured) same phase PESC were indeed electrically controlled by controlling the voltage and current applied to the PESC during cure.

Though not wishing to be bound by theory, the data of Table 1-2 can be understood when considering the conductivity. The American Peoples Encyclopedia (published by Excelsior Trading Corporation, vol. 5, p. 365, copyright 1976) describes electrical conductivity in materials which is incorporated herein by reference. Therein the conductivity of a material is defined as the current per unit cross-sectional area of the material per unit electric field. The conductivity of the samples given in Example 1 (and, in fact, in all of the samples of all of the Examples herein) is described by equation 2 (eq. 2), $$\sigma = \frac{i}{\alpha V/t} \quad \text{(eq. 2)}$$

wherein i is the current (in amps) through the sample;

v is voltage (in volts) across the sample (i.e. the voltage between the electrodes of the mold shown in FIG. 1);

t is the sample thickness (i.e. t shown in FIG. 1) in centimeters; and, $\alpha$ is the cross sectional area of the sample being electrically energized.

Figure 2:
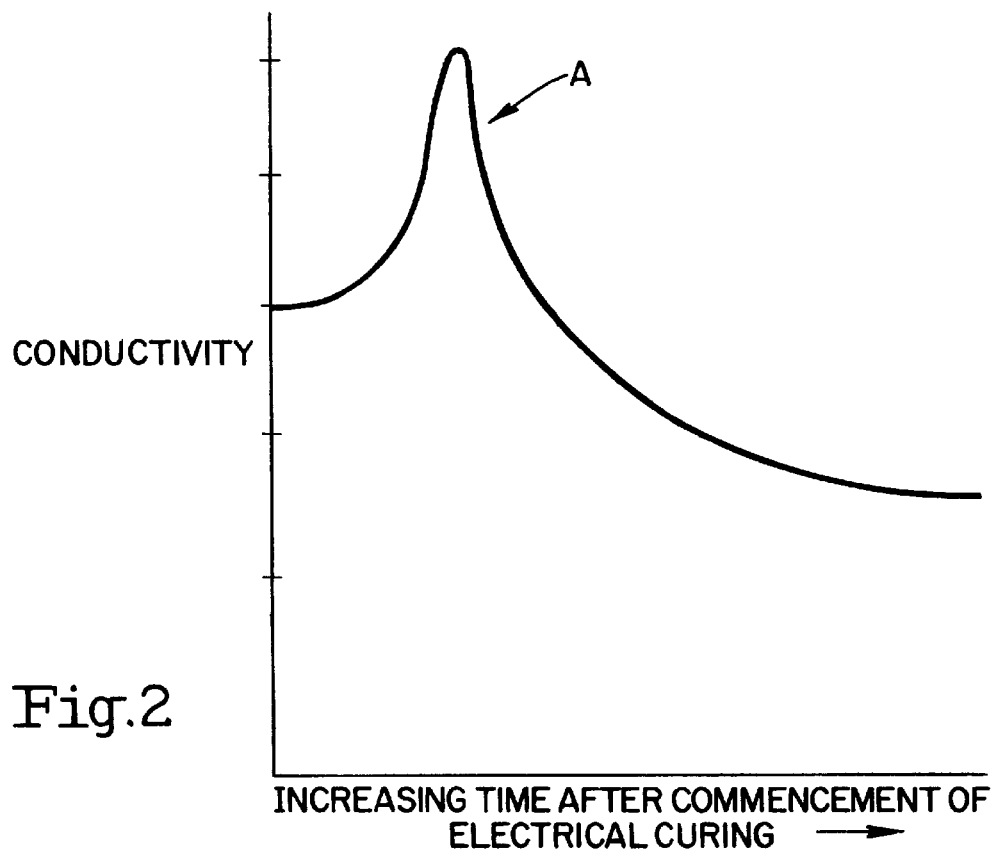
FIG. 2 graph depicting the conductivity of a typical same phase PESC during electrical programming of its end-product properties.

Conductivity is given in units of mho/cm or, alternatively, mho/m. Based upon the observed dimensions of the same phase PESC during the process of electrically programming the density of sample 2, and based upon the observed applied voltages and currents, equation 2 was used to calculate the instant conductivity of sample as a function of time after commencement of electrifying and programming the sample density. The results are given in Table 1-3. In FIG. 2, the general trend of initially increasing conductivity and thereafter subsequent decreasing conductivity is shown. The data in Table 1-3 follows this general trend.

ammonia with 100 grams of polyester resin and 20 drops of methyl ethyl ketone peroxide hardener. The isopropyl alcohol is packed and distributed by Diamond Products Company, of Seffner, Fla. The polyester resin and methyl ethyl ketone peroxide hardener are manufactured as a kit and sold by The Compositite Company of Decatur, Ga. It is sold under the stock number 5313.

Sample 1 of Example 2 was first fabricated. The formulation was poured into an electroset mold like the one illustrated in FIG. 1. The power supply output was set at a maximum output voltage of 8 kilovolts (kv) and a maximum output current of 15 milliamps (ma) and the mold energized. Within four minutes the sample had foamed and solidified into a permanent solid.

A second sample (sample 2) was fabricated in the same manner as the first sample (i.e. sample 1 of example 2) but with the power supply settings tuned with the maximum output voltage set at 8 kilovolts and maximum output current set at 7.5 milliamps.

A third sample (sample 3) was fabricated in the same manner as the first sample (i.e. sample 1 of example 1) but with the power supply settings tuned with the maximum output of 8 kilovolts and maximum output current set at 0 milliamps.

TABLE 1-3

| time after commencing energizing the sample (in min.) | observed input voltage (in volts) | observed input current (in amps) | observed sample height, h (in cm) | calculated conductivity $\sigma$ (in mho/cm) | observed gelation remarks |
|---|---|---|---|---|---|
| 0 | 8000 | .005 | 2.54 | $5.47 \times 10^{-8}$ | |
| 1 | 5000 | .005 | 2.54 | $8.76 \times 10^{-8}$ | |
| 2 | 3000 | .005 | 2.54 | $1.46 \times 10^{-7}$ | |
| 3 | 2000 | .005 | 2.54 | $2.19 \times 10^{-7}$ | |
| 4 | 2000 | .005 | 2.54 | $2.19 \times 10^{-7}$ | |
| 5 | 2100 | .005 | 2.54 | $2.09 \times 10^{-7}$ | |
| 6 | 2500 | .005 | 3.175 | $1.34 \times 10^{-7}$ | |
| 7 | 3000 | .005 | 4.445 | $8.83 \times 10^{-8}$ | sample gelation begins |
| 8 | 5000 | .005 | 5.715 | $3.89 \times 10^{-8}$ | sample viscosity increasing |
| 9 | 7000 | .005 | 6.98 | $2.27 \times 10^{-8}$ | sample viscosity increasing |
| 10 | 8000 | .0045 | 8.255 | $1.52 \times 10^{-8}$ | sample is solid, no longer gel |
| 11 | 8000 | .003 | 8.255 | $1.01 \times 10^{-8}$ | |
| 12 | 8000 | .0025 | 8.255 | $8.42 \times 10^{-9}$ | |
| 13 | 8000 | .002 | 8.255 | $6.73 \times 10^{-9}$ | |
| 14 | 8000 | .0019 | 8.255 | $6.4 \times 10^{-9}$ | |

It is clear from the data in Table 1-3 that the conductivity during cure can be used to indicate when gelation ensues and subsequent hardening of the PESC. In general, the gelation of a same phase PESC commences as the conductivity begins to diminish from its peak value. It proceeds thereafter until the PESC has hardened into a solid. Because the gelation is related to the extent of cure of the PESC, the diminishment of the conductivity just after reaching its peak value is an indication that the PESC has partially, but not fully cured.

Same phase PESCs of the present invention have characteristic conductivities that follow the general trend shown in FIG. 2. As shown in FIG. 2, the conductivity initially increases and then subsequently decreases with increasing time after electrical programming has commenced. Point A of FIG. 2 is on that part of the conductivity curve wherein the conductivity begins to diminish after reaching its peak value. It is at or about the time indicated by point A that gelation commences and the PESC can be considered partially cured. The extent of cure increases thereafter. This increase in extent of cure corresponds to the diminishment of the conductivity after point A.

EXAMPLE 2

Another same phase PESC was fabricated by thoroughly mixing 2 grams of isopropyl alcohol and 1 gram of clear After the samples of example 2 were fabricated, they were removed from their molds after 24 hours and their densities and hardnesses measured. The results obtained are given in Table 2-1.

TABLE 2-1

PHYSICAL PROPERTIES vs.
MAXIMUM POWER SUPPLY OUTPUT SETTINGS

| Sample number | maximum allowed output voltage (in kilovolts) | maximum allowed output current (in milliamps) | sample density (in grams per cubic inch) | sample hardness (in shore 'D') |
|---|---|---|---|---|
| 1 | 8 | 15 | 10.2 (g/cc) | 37 |
| 2 | 8 | 7.5 | 15.3 (g/cc) | 52 |
| 3 | 8 | 0 | 20.6 (g/cc) | 65 |

Clearly from the data shown in Table 2-1, both the hardness and density of the same phase PESC of example 2 were found to be electrically programmable. A duplicate set of samples was fabricated in the same manner as those samples from which the data in Table 2-1 originates. This duplicate set of samples were cut open and visibly inspected. Duplicate sample 3 was found to have few voids therein.

Duplicate sample 2 had some observable voids in it, much more than the few found in duplicate sample 3. Duplicate sample 1 was found to have far more voids within it than found in either duplicate samples 2 or 3. Both the visible inspection and the density data of Table 2-1 indicate the programmability of the density of the same phase PESC of example 2. The hardness measurements of Table 2-1, measured with the Rex Durometer, clearly indicates that the hardness is also electrically programmable.

EXAMPLE 3

Another same phase PESC of the present invention was fabricated by thoroughly mixing 4 grams of denatured alcohol and 4 grams ester of oleic acid with 50 grams of Ultraglo epoxy resin; and thereafter mixing the resultant mixture with 50 grams Ultraglo epoxy hardener. The denatured alcohol is sold under the title S-L-X Denatured Alcohol, manufactured by W. M. Barr & Co. Inc., Memphis, Tenn. The ester of oleic acid is manufactured and sold under the catalogue stock number PEG 600 by the Henkel Company located in Ambler, Pa.

Sample 1 of example 3 was first fabricated. The formulation was poured into an electroset mold like the one illustrated in FIG. 1. The power supply output was set at a maximum output voltage of 8 kilovolts (kv) and a maximum output current of 12.5 milliamps (ma) and the mold energized. Within nine minutes the sample had foamed and solidified into a permanent solid.

A second sample (sample 2) was fabricated in the same manner as the first sample (i.e. sample 1 of example 3) but with the power supply settings tuned with the maximum output voltage set at 8 kilovolts and maximum output current set at 6.0 milliamps.

A third sample (sample 3) was fabricated in the same manner as the first sample (i.e. sample 1 of example 3) but with the power supply settings tuned with the maximum output of 8 kilovolts and maximum output current set at 0 milliamps.

After the samples of example 3 were fabricated, they were removed from their molds after 1 hour and their densities measured. The results obtained are given in Table 3-1.

TABLE 3-1

PHYSICAL PROPERTIES vs.
MAXIMUM POWER SUPPLY OUTPUT SETTINGS

| Sample number | maximum allowed output voltage (in kilovolts) | maximum allowed output current (in milliamps) | sample density (in grams per cubic inch) |
|---|---|---|---|
| 1 | 8 | 12.5 | 7.92 (g/cc) |
| 2 | 8 | 6.0 | 10.2 (g/cc) |
| 3 | 8 | 0 | 11.8 (g/cc) |

The data for samples 1–3 of example 3 clearly demonstrate the variance in the end-product property of density. These density variations are clearly a function of the maximum allowed electric energy input into the samples. Samples 1, 2 and 3 clearly demonstrate density variations as a function of the maximum amount of current permitted to flow through the PESC samples during cure.

These tests were repeated several times and equivalent results were obtained each time, clearly demonstrating that same phase PESCs can be electrically programmed to have a desired density within a range of values.

EXAMPLE 4

Another same phase PESC of the present invention was fabricated by thoroughly mixing the following:

53 grams of Ultraglo epoxy resin;

5 grams clear ammonia;

1 gram Probond Polyurethane glue;

53 grams of Ultraglo epoxy hardener;

2.5 grams Two Ton Epoxy resin; and, 2.5 grams Two Ton Epoxy hardener.

The Two Ton Epoxy resin and Two Ton Epoxy hardener are manufactured and distributed by the Devcon Corporation of Wood Dale, Ill. The Probond Polyurethane glue is manufactured by Elmer's Products, Inc. of Columbus, Ohio and was purchased at a local hardware store.

Sample 1 of example 4 was first fabricated. The formulation was poured into an electroset mold like the one illustrated in FIG. 1. The power supply output was set at a maximum output voltage of 8 kilovolts (kv) and a maximum output current of 10 milliamps (ma) and the mold energized. Within seven minutes the sample had foamed and solidified into a permanent solid.

A second sample (sample 2) was fabricated in the same manner as the first sample (i.e. sample 1 of example 4) but with the power supply settings tuned with the maximum output voltage set at 8 kilovolts and maximum output current set at 5 milliamps.

A third sample (sample 3) was fabricated in the same manner as the first sample (i.e. sample 1 of example 4) but with the power supply settings tuned with the maximum output of 8 kilovolts and maximum output current set at 0 milliamps.

After the samples of example 4 were fabricated, they were removed from their molds after 24 hours and their densities measured. The results obtained are given in Table 4-1.

TABLE 4-1

PHYSICAL PROPERTIES vs.
MAXIMUM POWER SUPPLY OUTPUT SETTINGS

| Sample number | maximum allowed output voltage (in kilovolts) | maximum allowed output current (in milliamps) | sample density (in grams per cubic inch) |
|---|---|---|---|
| 1 | 8 | 10 | 3.94 (g/cc) |
| 2 | 8 | 5 | 6.2 (g/cc) |
| 3 | 8 | 0 | 8.55 (g/cc) |

The data for samples 1–3 of example 4 clearly demonstrate the variance in the end-product property of density. These density variations are clearly a function of the maximum allowed electric energy input into the samples. Samples 1, 2 and 3 clearly demonstrate density variations as a function of the maximum amount of current permitted to flow through the PESC samples during cure.

These tests were repeated several times and equivalent results were obtained each time, clearly demonstrating that same phase PESCs can be electrically programmed to have a desired density within a range of values.

EXAMPLE 5

Another same phase PESC of the present invention was fabricated by thoroughly mixing the following:

50 grams of Ultraglo epoxy resin;

3 grams clear ammonia;

1 gram PEG 600 ester of oleic acid;

2 grams latex enamel;

50 grams of Ultraglo epoxy hardener;

2.5 grams Two Ton Epoxy resin; and, 2.5 grams Two Ton Epoxy hardener.

The latex enamel is sold under the House Beautiful trademark, stock number 26271 and marketed by Wal-Mart Stores, Inc., Bentonville, Ariz. 72716.

Sample 1 of example 5 was first fabricated. The formulation was poured into an electroset mold like the one illustrated in FIG. 1. The power supply output was set at a maximum output voltage of 8 kilovolts (kv) and a maximum output current of 10 milliamps (ma) and the mold energized. Within seven minutes the sample had foamed and solidified into a permanent solid.

A second sample (sample 2) was fabricated in the same manner as the first sample (i.e. sample 1 of example 5) but with the power supply settings tuned with the maximum output voltage set at 8 kilovolts and maximum output current set at 5 milliamps.

A third sample (sample 3) was fabricated in the same manner as the first sample (i.e. sample 1 of example 5) but with the power supply settings tuned with the maximum output of 8 kilovolts and maximum output current set at 0 milliamps.

After the samples of example 5 were fabricated, they were removed from their molds after 24 hours and their densities measured. The results obtained are given in Table 5-1.

TABLE 5-1

PHYSICAL PROPERTIES vs.
MAXIMUM POWER SUPPLY OUTPUT SETTINGS

| Sample number | maximum allowed output voltage (in kilovolts) | maximum allowed output current (in milliamps) | sample density (in grams per cubic inch) |
|---|---|---|---|
| 1 | 8 | 10 | 5.07 (g/cc) |
| 2 | 8 | 5 | 6.2 (g/cc) |
| 3 | 8 | 0 | 6.9 (g/cc) |

The data for samples 1–3 of example 5 clearly demonstrate the variance in the end-product property of density. These density variations are clearly a function of the maximum allowed electric energy input into the samples. Samples 1, 2 and 3 clearly demonstrate density variations as a function of the maximum amount of current permitted to flow through the PESC samples during cure.

These tests were repeated several times and equivalent results were obtained each time, clearly demonstrating that same phase PESCs can be electrically programmed to have a desired density within a range of values.

EXAMPLE 6

Another same phase PESC of the present invention was fabricated by thoroughly mixing the following:

50 grams of Ultraglo epoxy resin;

3 grams of 5% HNO3 (cas number 7697-37-2)

1 gram Probond Polyurethane glue;

50 grams of Ultraglo epoxy hardener;

2.5 grams Two Ton Epoxy resin; and, 2.5 grams Two Ton Epoxy hardener.

Sample 1 of example 6 was first fabricated. The formulation was poured into an electroset mold like the one illustrated in FIG. 1. The power supply output was set at a maximum output voltage of 8 kilovolts (kv) and a maximum output current of 10 milliamps (ma) and the mold energized. Within eight minutes the sample had foamed and solidified into a permanent solid.

A second sample (sample 2) was fabricated in the same manner as the first sample (i.e. sample 1 of example 6) but with the power supply settings tuned with the maximum output voltage set at 8 kilovolts and maximum output current set at 5 milliamps.

A third sample (sample 3) was fabricated in the same manner as the first sample (i.e. sample 1 of example 6) but with the power supply settings tuned with the maximum output of 8 kilovolts and maximum output current set at 0 milliamps.

After the samples of example 6 were fabricated, they were removed from their molds after 24 hours and their densities measured. The results obtained are given in Table 6-1.

TABLE 6-1

PHYSICAL PROPERTIES vs.
MAXIMUM POWER SUPPLY OUTPUT SETTINGS

| Sample number | maximum allowed output voltage (in kilovolts) | maximum allowed output current (in milliamps) | sample density (in grams per cubic inch) |
|---|---|---|---|
| 1 | 8 | 10 | 3.88 (g/cc) |
| 2 | 8 | 5 | 7.1 (g/cc) |
| 3 | 8 | 0 | 10.2 (g/cc) |

The data for samples 1–3 of example 6 clearly demonstrate the variance in the end-product property of density. These density variations are clearly a function of the maximum allowed electric energy input into the samples. Samples 1, 2 and 3 clearly demonstrate density variations as a function of the maximum amount of current permitted to flow through the PESC samples during cure.

These tests were repeated several times and equivalent results were obtained each time, clearly demonstrating that same phase PESCs can be electrically programmed to have a desired density within a range of values.

It is appreciated that many other programmable electrosettable compositions with electrically programmable properties may be used without departing from the scope of this invention. It is still further appreciated that particles with negligible electrical polarizability can be added to the same phase PESCs of the present invention without departing from the scope of the present invention. Such particles with negligible electrical polarizability, if added in small quantity, do not inhibit the programmability of the PESCs of the present invention.

EXAMPLE 7

A same phase PESC was fabricated like the one in Example 1 and 1 gram of granite particles added thereto. The granite particles were obtained by taking a small rock consisting of granite and crushing it into particles with a hammer. Similar results to the ones obtained in Example 1 were obtained.

EXAMPLE 8

A same phase PESC was fabricated like the one in Example 1 and 1 gram of feldspar particles added thereto. The feldspar particles were obtained by taking a small rock consisting of feldspar and crushing it into particles with a hammer. Similar results to the ones obtained in Example 1 were obtained.

EXAMPLE 9

A same phase PESC was fabricated like the one in Example 3 and 1 gram of feldspar particles added thereto.

The feldspar particles were obtained by taking a small rock consisting of feldspar and crushing it into particles with a hammer. Similar results to the ones obtained in Example 3 were obtained.

EXAMPLE 10

A same phase PESC was fabricated like the one in Example 3 and 1 gram of quartz particles added thereto. The quartz particles were obtained by taking a small rock consisting of feldspar and crushing it into particles with a hammer. Similar results to the ones obtained in Example 3 were obtained.

The samples from Examples 1, 3, 5 and 6 were each encapsulated in a solid enclosure of plastic wrap. Aluminum foil was then glued onto the outside of each of these samples and the samples again wrapped in plastic wrap. The plastic wrap was purchased at a local Giant Food store. The plastic wrap is often used to wrap around foods to keep the foods fresh while they are in storage.

The samples so wrapped were then thrown into a swimming pool at during hours of darkness. A flashlight was used to illuminate them. They were observed to float. Furthermore, upon shining the light of a flashlight on them, they were observed to reflect the light from the flashlight. Such floatation devices can be used in circumstances of emergency wherein a boat capsizes at night. Several of these devices, if thrown out onto the surface of the water, can reflect the light from searchlights used by rescue parties. The area where the boat capsized can thereby be illuminated and rescuers thereby alerted that they are in the vicinity of potential survivors of the boat accident.

Same phase PESCs and the processes of electrically programming their end-product properties have herewith been disclosed. Furthermore, methods of determining the onset of gelation and the extent of cure associated with the process of programming have been disclosed.

In examples 7–10, the particles of negligible electrical polarizability of granite and feldspar were incorporated into the PESCs. These PESCs would otherwise be same phase PESCs. Examples 7–10 illustrate the point that it is possible to incorporate the use of particles of negligible electrical polarizability in with such PESCs without departing from the scope or spirit of the present invention. It will be appreciated in light of this disclosure that many other kinds of programmable electrosettable compositions may be used without departing from the scope or spirit of the present invention. It is understood that the embodiments herein described are only illustrative of the applications of the principles of the invention and that numerous modifications, alternative embodiments and arrangements may be readily devised by those skilled in the art in light of this disclosure without departing from the scope and spirit of the present invention. It is to be understood that within the scope of the appended claims, the invention can be practiced otherwise than as specifically described herein.

What is claimed is:

1. A process for making and curing a "same phase programmable electroset composition" so as to alter at least one end-product property selected from the group of end-product properties consisting of density, hardness and buoyancy, said process comprising:

a) providing a quantity of a phase changing vehicle which is both a dielectric and a polymer;

b) providing a quantity of an electrically conductive additive, said conductive additive being in a fluid state;

c) adding and mixing said quantity of phase changing vehicle with said quantity of said electrically conductive additive thereby resulting in a "same phase programmable electroset composition" wherein said conductive additive comprises no more than 20% by weight of the composition of said "same phase programmable electroset composition" and wherein the electrical conductivity of said "same phase programmable electroset composition" is more than $1 \times 10^{-11}$ mho/cm but less than $1 \times 10^2$ mho/cm;

d) positioning said "same phase programmable electroset composition" between at least two electrically conductive substrates;

e) charging said conductive substrates, thereby exposing said "same phase programmable electroset composition" to an electric field; and f) maintaining said charging so as to establish an electric current within said "same phase programmable electroset composition";

whereby said "same phase programmable electroset composition", in a cured state, has at least one said end-product property which is altered by at least 5% with respect to that said end-product property which would be obtained for said "same phase programmable electroset composition", in a cured state, by a process for curing said "same phase programmable electroset composition" which does not include said charging; and whereby said alteration is a function of the amount of said current within said "same phase programmable electroset composition".

2. A process for curing a "same phase programmable electroset composition" as in claim 1 further comprising providing means for monitoring of the voltage between said two substrates, said voltage resulting from said charging;

providing means for monitoring of said current through said "same phase programmable electroset composition"; and, thereafter monitoring said voltage and current during the cure of said "same phase programmable electroset composition".

3. A process in claim 1 wherein the end-product property is density.

4. A process in claim 1 wherein the end-product property is hardness.

5. A process as in claim 1 wherein the phase changing vehicle further comprises polyester.

6. A process as in claim 1 wherein the phase changing vehicle further comprises latex.

7. A process as in claim 1 wherein the phase changing vehicle further comprises polyurethane.

8. A process as in claim 1 wherein said phase changing vehicle further comprises epoxy.

9. A process as in claim 1 further comprising the process of adding solid particles to said "same phase programmable electroset composition" wherein said particles have negligible electrical polarizability and wherein said adding of said particles is accomplished prior to said charging.

* * * * *